United States Patent
Jaradi et al.

(10) Patent No.: US 11,148,631 B2
(45) Date of Patent: Oct. 19, 2021

(54) VEHICLE AIRBAG

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Anil Kalra, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/591,259

(22) Filed: Oct. 2, 2019

(65) Prior Publication Data

US 2021/0101556 A1 Apr. 8, 2021

(51) Int. Cl.
| | |
|---|---|
| *B60R 21/2334* | (2011.01) |
| *B60R 21/231* | (2011.01) |
| *B60R 21/232* | (2011.01) |
| *B60R 21/205* | (2011.01) |
| *B60R 21/264* | (2006.01) |
| *B60R 21/00* | (2006.01) |
| *B60R 21/16* | (2006.01) |

(52) U.S. Cl.
CPC .......... *B60R 21/232* (2013.01); *B60R 21/205* (2013.01); *B60R 21/2334* (2013.01); *B60R 21/264* (2013.01); *B60R 2021/0004* (2013.01); *B60R 2021/0053* (2013.01); *B60R 2021/161* (2013.01); *B60R 2021/23107* (2013.01); *B60R 2021/23169* (2013.01)

(58) Field of Classification Search
CPC ........................................... B60R 2021/23386
See application file for complete search history.

(56) References Cited

U.S. PATENT DOCUMENTS

| | | | | |
|---|---|---|---|---|
| 5,462,308 A | * | 10/1995 | Seki ................... | B60R 21/08 280/730.2 |
| 5,865,462 A | * | 2/1999 | Robins ................ | B60R 21/232 280/730.2 |
| 5,924,723 A | * | 7/1999 | Brantman ............ | B60R 21/232 280/730.2 |
| 6,237,938 B1 | * | 5/2001 | Boxey ................. | B60R 21/232 280/730.2 |
| 6,412,810 B1 | * | 7/2002 | Wipasuramonton .................... | B60R 21/213 280/728.2 |
| 6,474,681 B2 | * | 11/2002 | Peer ..................... | B60R 21/232 280/730.2 |
| 6,688,641 B2 | * | 2/2004 | Dominissini ........ | B60R 21/232 280/730.2 |
| 6,808,198 B2 | | 10/2004 | Schneider et al. | |
| 6,896,288 B2 | * | 5/2005 | Tanaka ................ | B60R 21/232 280/730.2 |

(Continued)

*Primary Examiner* — Nicole T Verley
(74) *Attorney, Agent, or Firm* — Frank A. MacKenzie; Bejin Bieneman PLC

(57) ABSTRACT

A vehicle includes a front bulkhead. The vehicle includes an airbag inflatable from an uninflated position to an inflated position adjacent the bulkhead. The vehicle includes a track fixed relative to the bulkhead. The vehicle includes a slider fixed to the airbag and slidable along the track between a first position when the airbag is in the uninflated position and a second position when the airbag is in the inflated position.

20 Claims, 10 Drawing Sheets

(56) References Cited

U.S. PATENT DOCUMENTS

| | | | |
|---|---|---|---|
| 6,994,371 B2* | 2/2006 | Bossecker | B60R 21/232 280/730.2 |
| 7,111,871 B2 | 9/2006 | Thomas | |
| 7,125,039 B2* | 10/2006 | Bossecker | B60R 21/232 280/730.2 |
| 7,174,986 B2* | 2/2007 | Takimoto | B60R 21/2338 180/274 |
| 7,219,921 B2* | 5/2007 | Noguchi | B60R 21/232 280/730.2 |
| 7,273,228 B2* | 9/2007 | Noguchi | B60R 21/213 280/728.2 |
| 7,306,258 B2* | 12/2007 | Noguchi | B60R 21/232 280/730.2 |
| 7,322,606 B2* | 1/2008 | Yamamura | B60J 1/2025 280/730.2 |
| 7,338,071 B2* | 3/2008 | Noguchi | B60R 21/213 280/730.2 |
| 7,347,447 B2* | 3/2008 | Nakanishi | B60R 21/232 280/730.2 |
| 7,507,005 B1 | 3/2009 | Mier-Langner | |
| 7,661,701 B2* | 2/2010 | Hirata | B60R 21/233 280/730.2 |
| 9,333,934 B2* | 5/2016 | Sitko | B60R 21/2338 |
| 9,428,138 B2* | 8/2016 | Farooq | B60R 21/2338 |
| 9,676,361 B2* | 6/2017 | Smith | B60R 21/214 |
| 9,994,182 B1* | 6/2018 | Jaradi | B60R 21/232 |
| 10,279,770 B2* | 5/2019 | Faruque | B60R 21/2342 |
| 10,336,279 B2* | 7/2019 | Farooq | B60R 21/205 |
| 10,625,704 B2* | 4/2020 | Dry | B60R 21/233 |
| 2005/0140124 A1* | 6/2005 | Noguchi | B60R 21/232 280/730.2 |
| 2007/0046001 A1* | 3/2007 | Hirata | B60R 21/232 280/730.2 |
| 2017/0015269 A1* | 1/2017 | Min | B60R 21/2338 |
| 2017/0267199 A1* | 9/2017 | Schutt | B60R 21/13 |

* cited by examiner

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
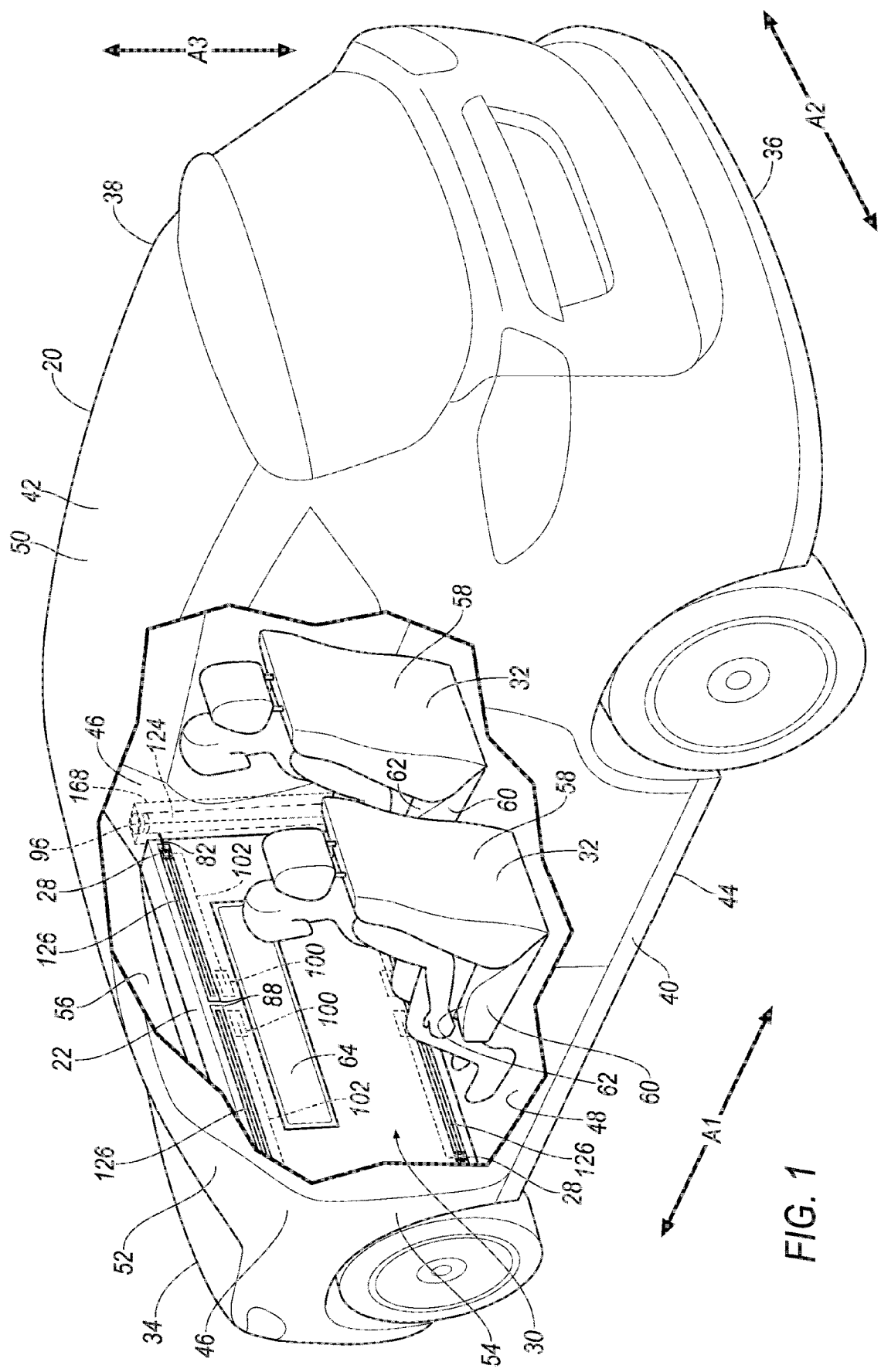
FIG. 1 is a perspective view of a vehicle having an airbag in an uninflated position.

A vehicle includes a front bulkhead. The vehicle includes an airbag inflatable from an uninflated position to an inflated position adjacent the bulkhead. The vehicle includes a track fixed relative to the bulkhead. The vehicle includes a slider fixed to the airbag and slidable along the track between a first position when the airbag is in the uninflated position and a second position when the airbag is in the inflated position.

The vehicle may include a retractor fixed relative to the bulkhead and operatively coupled to the slider.

The retractor may include a pyrotechnic rotary actuator operatively coupled to the slider with a cable.

The vehicle may include a seat having a seating surface, and the airbag in the inflated position may include a bottom edge that is lower than the seating surface.

The airbag in the inflated position may be located relative to a seat to control movement of knees of a test dummy in the seat during a vehicle front impact.

The vehicle may include a retainer supported relative to the track and configured to maintain the slider in the second position.

The vehicle may include a stop fixed relative to the track at the second position.

The vehicle may include a second track fixed relative to the bulkhead and a second slider fixed to the airbag and slidable along the second track.

The track may be spaced from the second track along a vertical axis.

The track may be spaced from the second track along a cross-vehicle axis.

The track may be elongated along a cross-vehicle axis.

The track may be elongated along a vertical axis.

The vehicle may include a pillar, the track fixed to the pillar.

The front bulkhead may include an instrument panel.

The track may be beneath the instrument panel.

The airbag in the uninflated position may be elongated along a cross-vehicle axis and may be beneath the instrument panel.

The airbag may define an inflation direction that is inboard along a cross-vehicle axis.

The airbag may define an inflation direction that is upward along a vertical axis.

The airbag may define an inflation direction that is downward along a vertical axis.

The vehicle may include a second airbag inflatable from an uninflated position to an inflated position adjacent bulkhead, the airbag and the second airbag inflating toward each other.

With reference to the Figures, wherein like numerals indicate like parts throughout the several views, a vehicle 20 includes a front bulkhead 22. The vehicle 20 includes an airbag 124, 224, 324 inflatable from an uninflated position to an inflated position adjacent the bulkhead 22. The vehicle 20 includes a track 126, 226, 326 fixed relative to the bulkhead 22. The vehicle 20 includes a slider 28 fixed to the airbag 124, 224, 324 and slidable along the track 126, 226, 326 between a first position when the airbag 124, 224, 324 is in the uninflated position and a second position when the airbag 124, 224, 324 is in the inflated position.

The track 126, 226, 326 and slider 28 guide the airbag 124, 224, 324 as the airbag 124, 224, 324 moves from the from the uninflated position to the inflated position. Additionally, the track 126, 226, 326 and slider 28 control kinematics of the airbag 124, 224, 324 in the inflated position, e.g., relative to the front bulkhead 22.

The vehicle 20 may be any type of passenger or commercial automobile such as a car, a truck, a sport utility vehicle, a crossover vehicle, a van, a minivan, a taxi, a bus, etc. The vehicle 20 includes a passenger cabin 30 to house occupants, if any, of the vehicle 20. The passenger cabin 30 includes one or more seats 32.

The vehicle 20 defines a longitudinal axis A1, i.e., extending between a front 34 and a rear 36 of the vehicle 20. The vehicle 20 defines a cross-vehicle axis A2, i.e., extending between a right side 38 and a left side 40 of the vehicle 20. The vehicle 20 defines a vertical axis A3, i.e., extending between a top 42 and a bottom 44 of the vehicle 20. The longitudinal axis A1, the cross-vehicle axis A2, and the vertical axis A3 are perpendicular to each other.

The vehicle 20 may include a body and a frame. The body and frame may be of a unibody construction. In the unibody construction, the body, e.g., rockers, pillars 46, a floor 48, a roof 50, etc. serves as the frame, and the body (including the rockers, pillars 46, roof 50, etc.) is unitary, i.e., a continuous one-piece unit. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, etc.

The pillars 46 are elongated generally vertically, e.g., between the bottom 44 and the top 42 of the vehicle 20. The pillars 46 provide structural rigidity to the vehicle 20, and support other components of the vehicle 20. For example, the pillars 46 may be A-pillars 52 that support the roof 50 at the front of the passenger cabin 30. Each A-pillar 52 may include a support column, a body panel, and a trim cover. The body panel and the trim cover may have a class-A exterior surface, i.e., a surface specifically manufactured to have a high quality, finished aesthetic appearance free of blemishes. The body panel and trim cover may be supported by the support column. The body panel, the support column, and/or the trim cover may be formed of any suitable material, for example, steel, aluminum, plastic, composite, etc. As another example, the pillars 46 may be hinge pillars 54. Each hinge pillar 54 may be located adjected an opening in the vehicle 20 configured to permit entry and egress of occupants to and from the vehicle 20. The hinge pillar 54 may support a door covering such opening. The hinge pillar 54 may be directly below the A-pillar 52. The hinge pillar 54 may be formed of any suitable material, for example, steel, aluminum, etc.

The vehicle 20 includes a windshield 56. The windshield 56 prevents objects from entering the passenger cabin 30 of the vehicle 20, e.g., rain, bugs, etc. The windshield 56 is transparent, e.g., to permit the occupants to see therethrough. The windshield 56 may be formed of any suitable material, e.g., glass, plastic, laminate, etc. The windshield 56 may extend from one A-pillar 52 to the other A-pillar 52. The windshield 56 may extend from the front bulkhead 22 to the roof 50. The windshield 56 may be secured to the A-pillars 52, e.g., with an adhesive.

Figure 2:
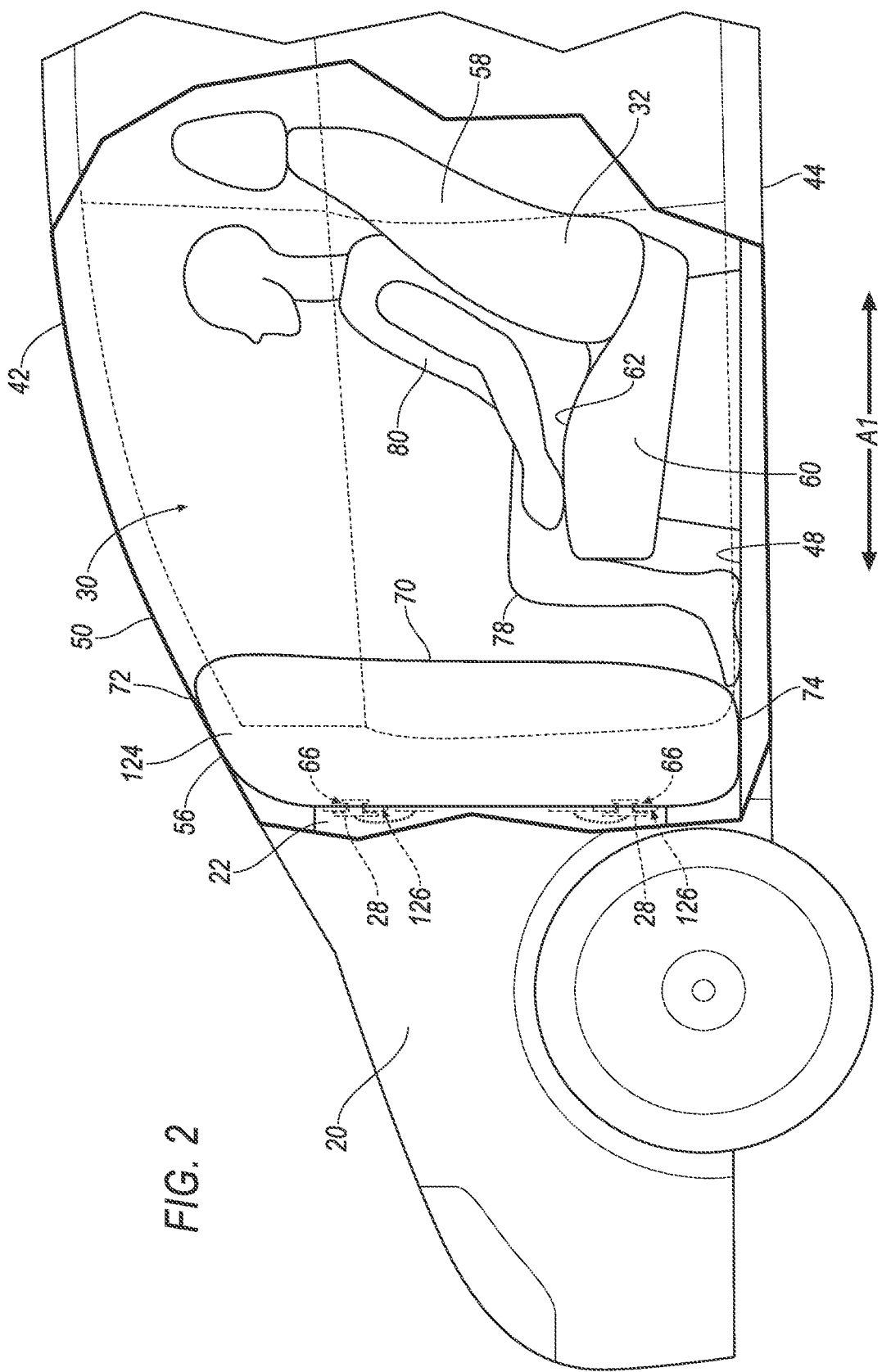
FIG. 2 is a side view of the vehicle having the airbag in an inflated position.

The seat 32 shown in FIGS. 1 and 2 is a bucket seat, but alternatively the seat 32 may be a bench seat or another type of seat. The seat 32 may include a seat back 58 and a seat bottom 60. The seat back 58 may be supported by the seat bottom 60 and may be stationary or movable relative to the seat bottom 60. The seat 32, e.g., the seat bottom 60, has a seating surface 62. The seating surface 62 supports an occupant of the seat 32.

The front bulkhead 22 is disposed at a forward end of the passenger cabin 30 and faces toward the seats 32. The front bulkhead 22 may extend from the hinge pillar 54 on the right side 38 of the vehicle 20 to the hinge pillar 54 on the left side 40 of the vehicle 20. In other words, the front bulkhead 22 may extend completely across the front end of the passenger cabin 30 relative to the cross-vehicle axis A2. The front bulkhead 22 may extend from the floor 48 of the passenger cabin 30 to the windshield 56 relative to the vertical axis A3. The front bulkhead 22 may include an instrument panel 64 that includes one or more instruments such as gauges, displays, a user interface, etc. The instrument panel 64 may be elongated along the cross-vehicle axis A2. The user interface presents information to and receives information from an occupant of the vehicle 20. The user interface may include dials, digital readouts, screens such as a touch-sensitive display screen, speakers, buttons, knobs, keypads, microphone, and so on for providing information to, and receiving information from, the occupant.

Figure 3:
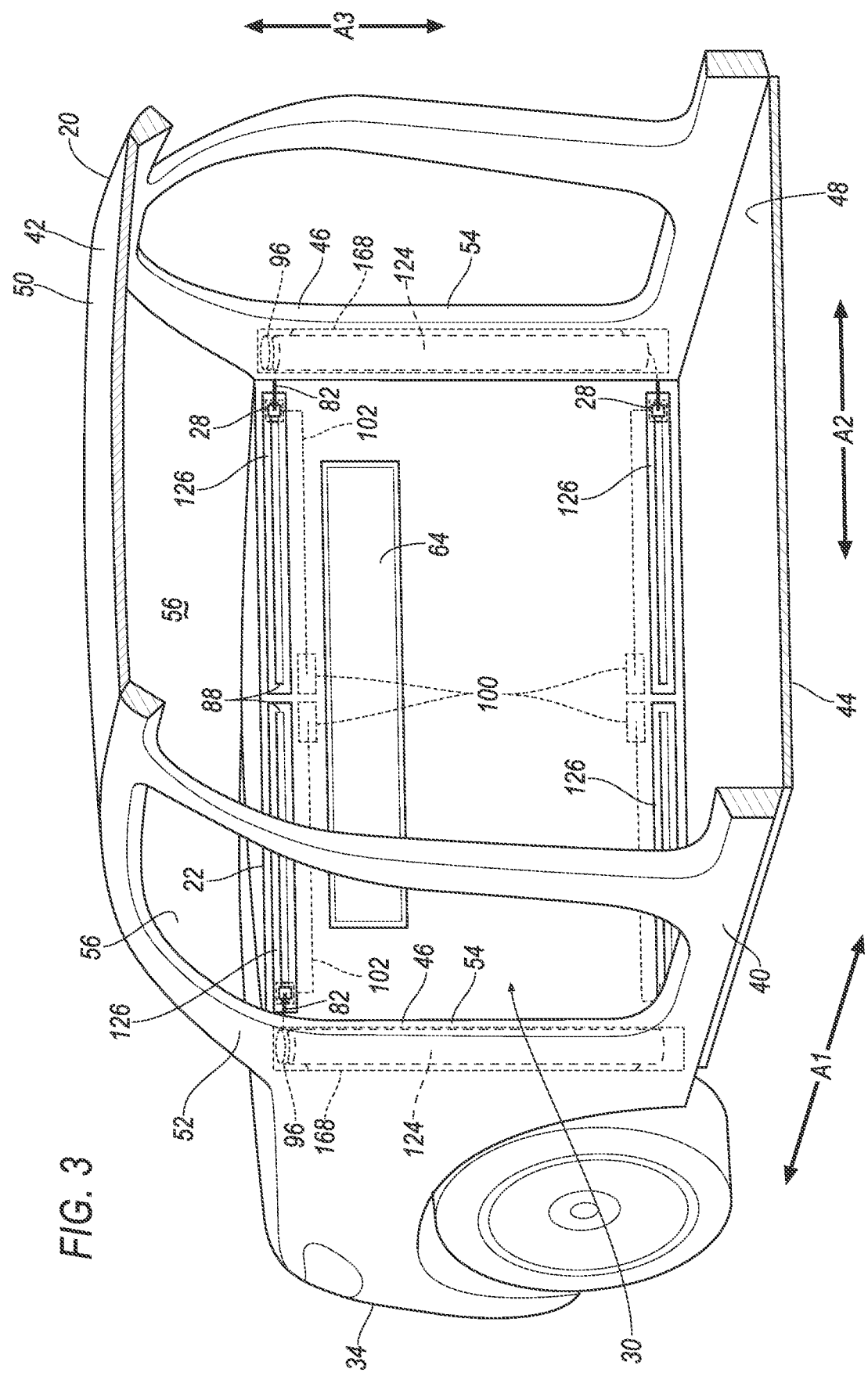
FIG. 3 is a perspective view of the vehicle having the airbag in the uninflated position.
Figure 4:
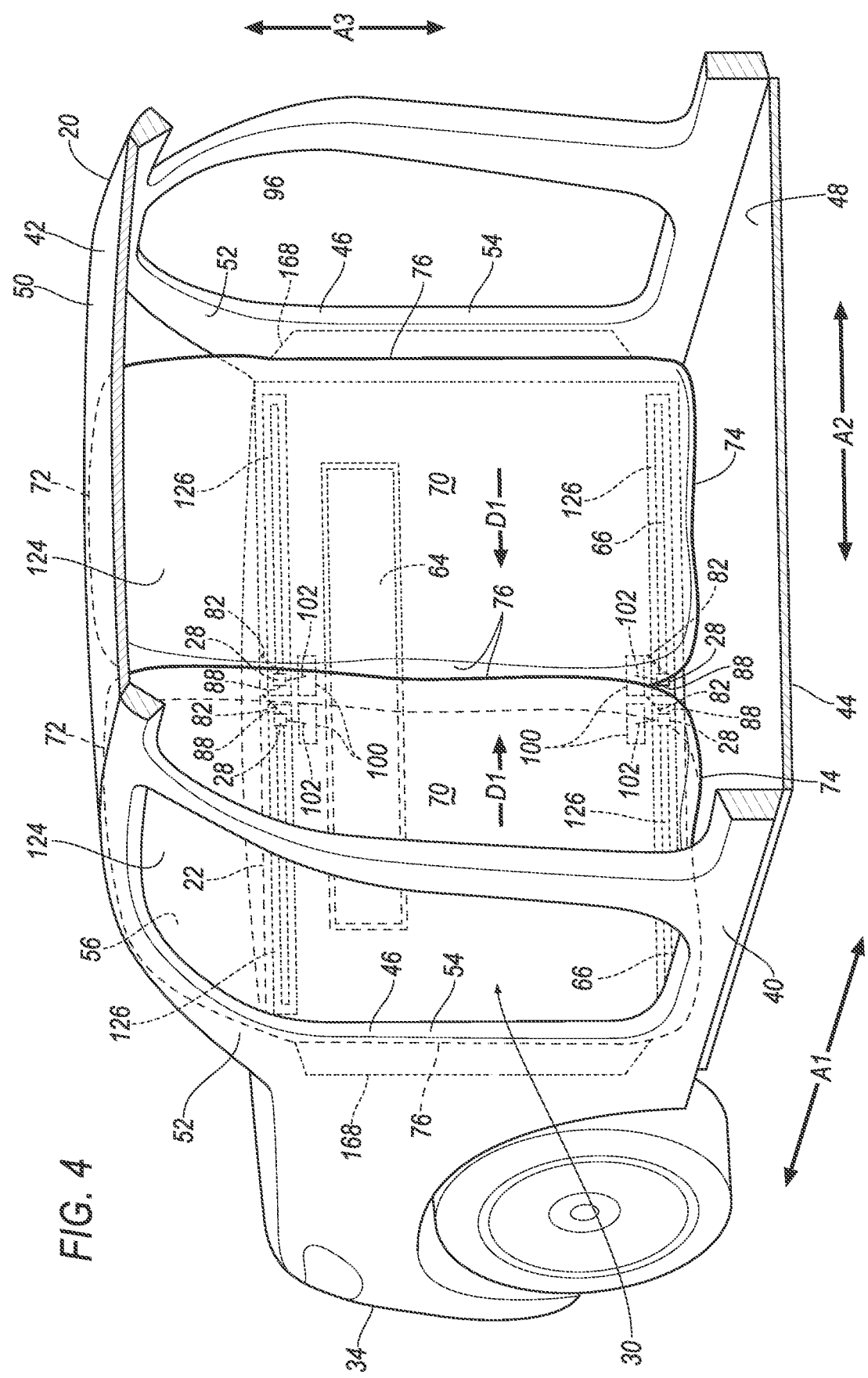
FIG. 4 is a perspective view of the vehicle having the airbag in the inflated position.

The vehicle 20 includes one or more tracks 126, 226, 326 to guide movement of the airbag 124, 224, 324 as the airbag 124, 224, 324 deploys and controls kinematics of the airbag 124, 224, 324 in the inflated position, e.g., via the sliders 28. Each track 126, 226, 326 is elongated between distal ends. For example, as illustrated in FIGS. 1, 3 and 4, the tracks 126 may elongated along the cross-vehicle axis A2. In other words, the distal ends of each track 126 may be spaced from each other along the cross-vehicle axis A2. As another example, as illustrated in FIGS. 5-8, the tracks 226, 326 may be elongated along the vertical axis A3.

Figure 9:
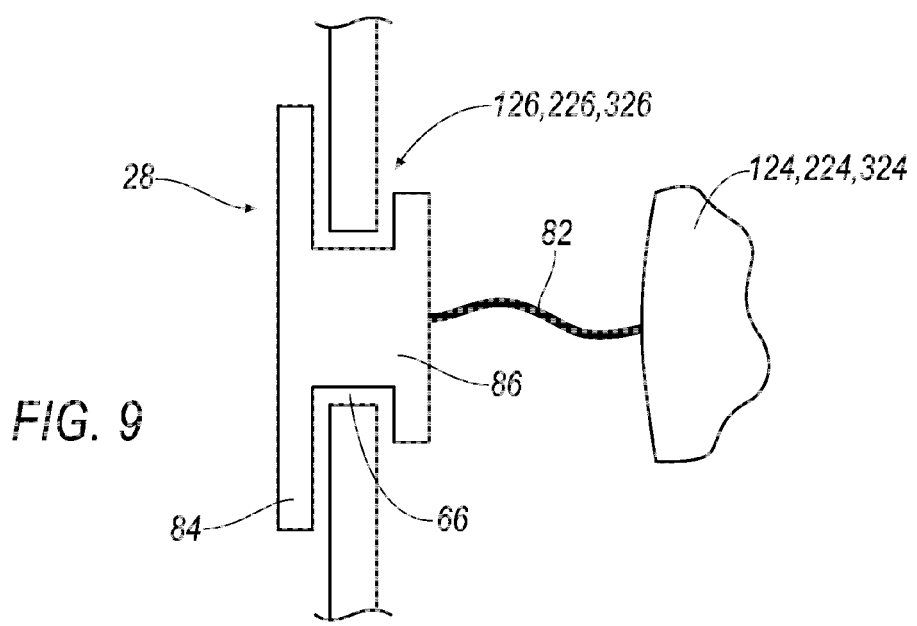
FIG. 9 is a cross section of a track of the vehicle.
Figure 10:
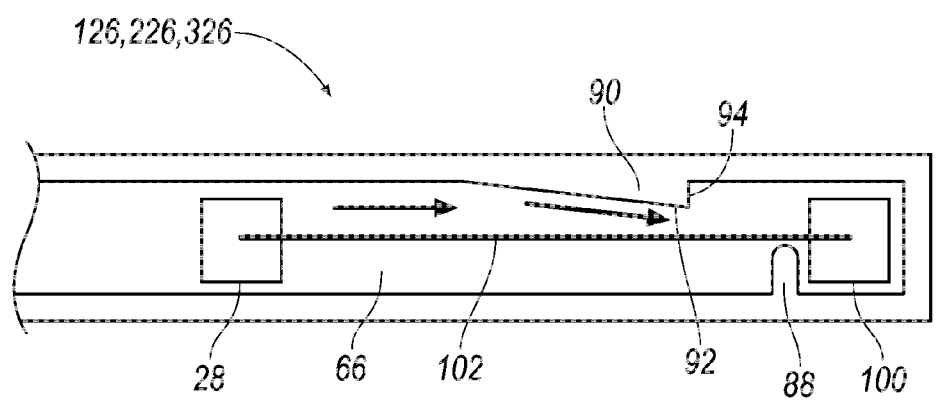
FIG. 10 is an illustration of a close up of a portion of the track and having a slider in a first position.
Figure 11:
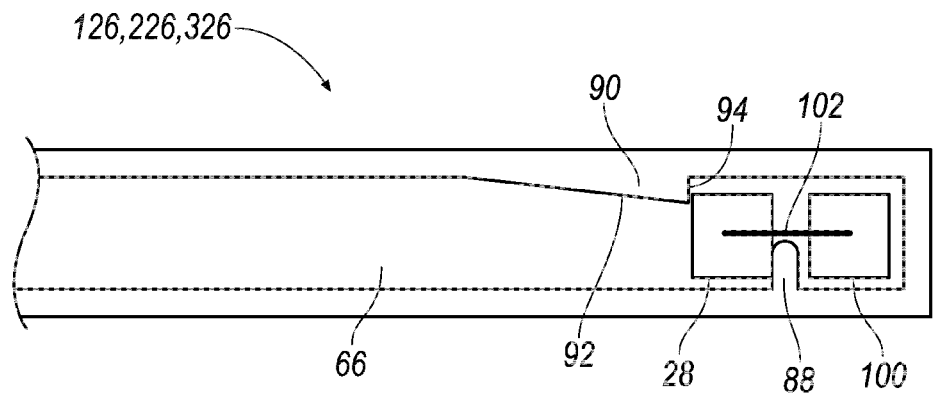
FIG. 11 is an illustration of the track is an illustration of a close up of the portion of the track and having the slider in a second position.

Each track 126, 226, 326 may define a passage 66, illustrated in FIGS. 9-11, elongated along the track 126, 226, 326, e.g., the track 126, 226, 326 may have a C-channel, or any other suitable, structure. The track 126, 226, 326 may permit movement of the slider 28 along the elongation of the track 126, 226, 326, e.g., along the passage and between the distal ends. The track 126, 226, 326 may restrict movement of the slider 28 transverse to the elongation of the track 126, 226, 326. In the Figures, each airbag 124, 224, 324 is guided via first and second tracks 126, 226, 326 and first and second sliders 28. However, a single track 126, 226, 326 and slider 28 may be used (not shown). The adjectives "first" and "second" are used throughout this document as identifiers and are not intended to signify importance or order The tracks 126, 226, 326 are fixed relative to the bulkhead 22, e.g., via fastener, weld, etc. For example, and with refence to FIGS. 1-4, the tracks 126 may be fixed to the floor 48 and/or the front bulkhead 22. One of such tracks 126 may be beneath the instrument panel 64, e.g., relative to the vertical axis A3. In other words, the instrument panel 64 may be between the roof 50 and one of the tracks 126, relative to the vertical axis A3. As another example, and with refence to FIGS. 5-8, the tracks 226, 326 may be fixed to the pillars 46, e.g., to the A-pillar 52 and/or the hinge pillar 54.

The first and second tracks 126, 226, 326 guiding inflation of one of the airbags 124, 224, 324 of the vehicle 20 may be spaced form each other. For example, and with refence to FIGS. 1-4, the tracks 126 may be spaced from each other along the vertical axis A3. In other words, one of the tracks 126 may be closer to the floor 48 than another of the tracks 126 relative to the vertical axis A3. As another example, and with refence to FIGS. 5-8, one of the tracks 226, 326 may be spaced from another of the tracks 226, 326 along the cross-vehicle axis A2. In other words, one of the tracks 226, 326 may be closer to the right side 38 of the vehicle 20 than another of the tracks 226, 326 relative to the cross-vehicle axis A2.

The vehicle 20 may include one more airbag housings 168, 268, 368. The airbag 124, 224, 324 in the uninflated position may be disposed in the housing 168, 268, 368. The housing 168, 268, 368 may provide a reaction surface for the airbag 124, 224, 324 in the inflated position. The housing 168, 268, 368 may be formed of any material, e.g., a rigid polymer, a metal, a composite, etc. For example, and with refence to FIGS. 1, 3, and 4, the housing 168 may be fixed to the pillar 46, e.g., to the A-pillar 52 and/or the hinge pillar 54. As another example, and with refence to FIGS. 5-8, the housing 268, 368 may fixed to the floor 48 and/or the roof 50. Alternatively, the housing 1658, 268, 368 may be fixed to any suitable structure.

The airbag 124, 224, 324 controls kinematics of objects in the passenger cabin 30, e.g., in the inflated position during an impact to the vehicle 20. The airbag 124, 224, 324 may be formed of a woven polymer or any other material. As one example, the airbag 124, 224, 324 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Each airbag 124, 224, 324 is inflatable from the uninflated position, illustrated in FIGS. 1, 3, 5, and 7. The airbag 124, 224, 324 in the uninflated position may be packaged into the housing 168, 268, 368 by folding and/or rolling the airbag 124, 224, 324. Folding and/or rolling the airbag 124, 224, 324 enables the airbag 124, 224, 324 to inflate to the inflated position by unfolding and/or unrolling to expand from the uninflated position.

Figure 5:
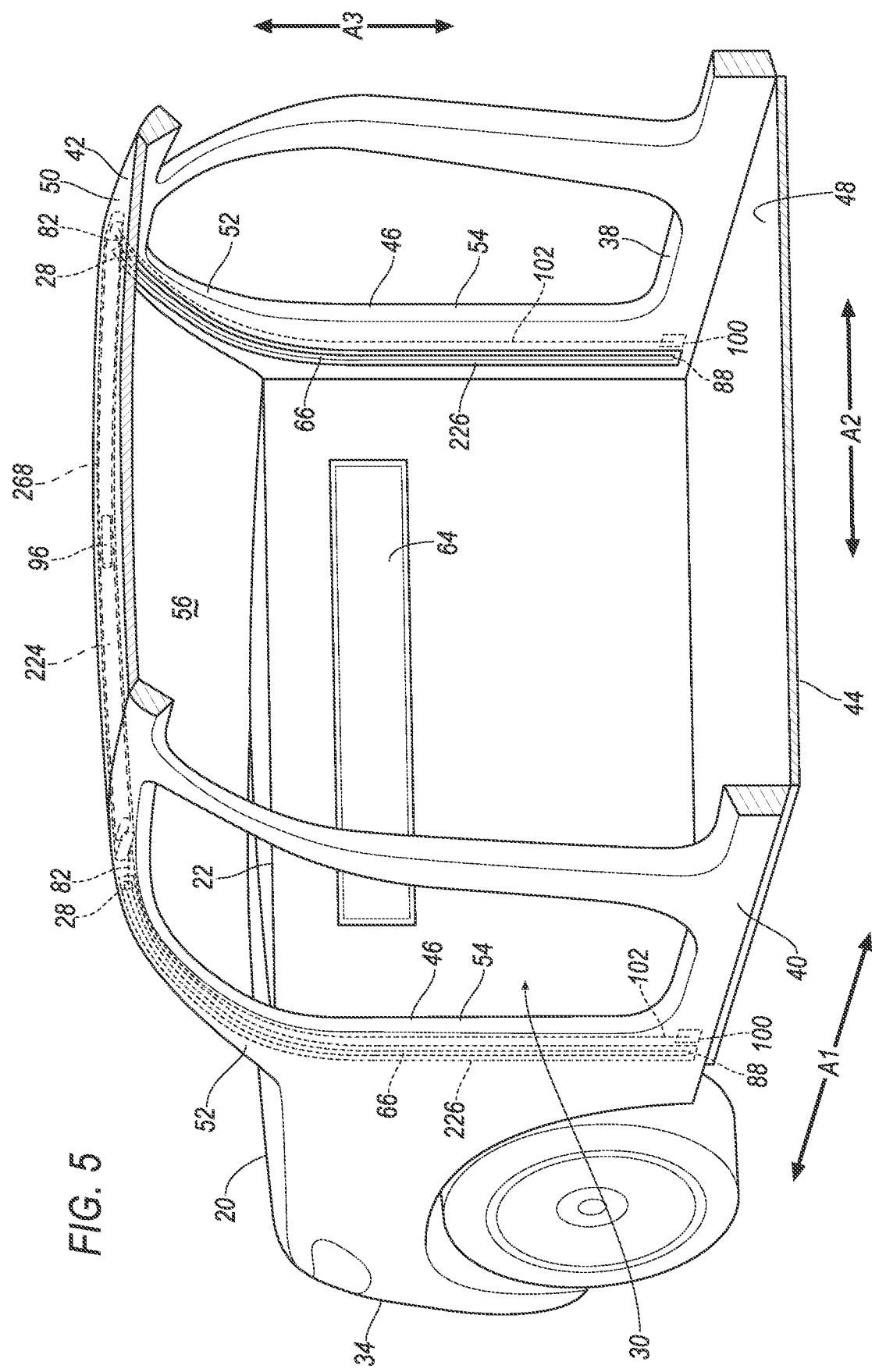
FIG. 5 is a perspective view of the vehicle having another airbag in an uninflated position.
Figure 6:
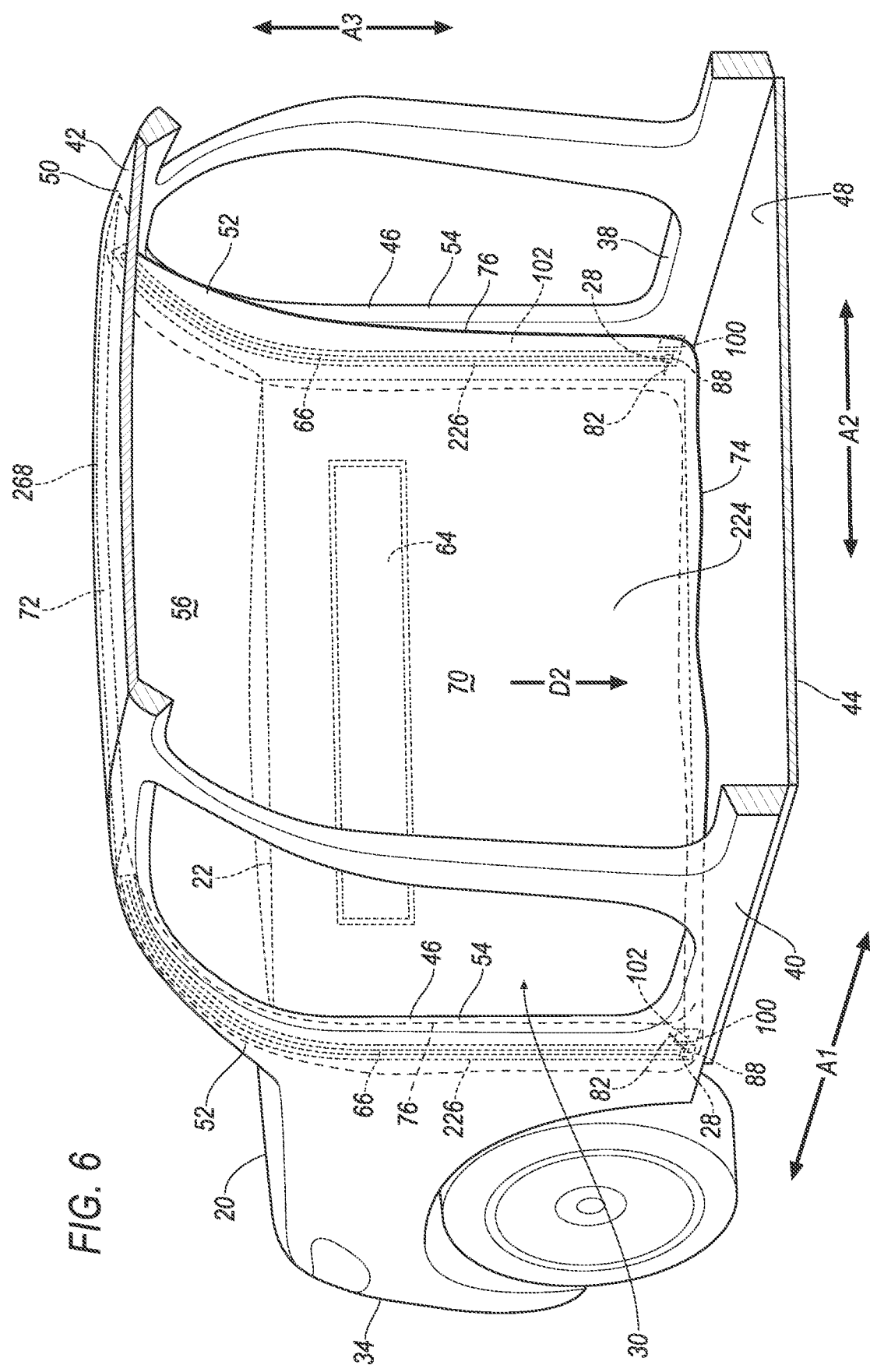
FIG. 6 is a perspective view of the vehicle having the airbag of FIG. 5 in an inflated position.
Figure 7:
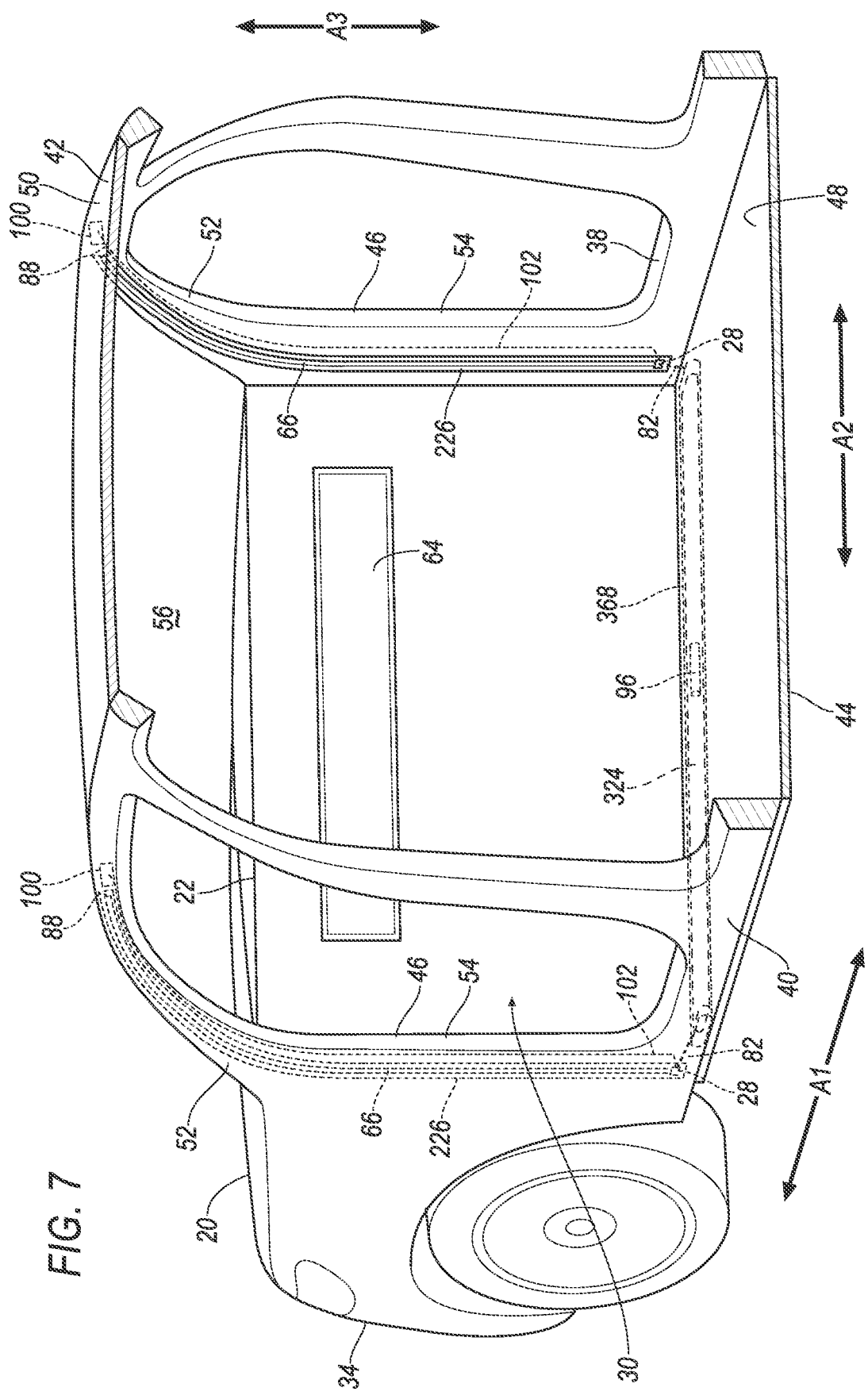
FIG. 7 is a perspective view of the vehicle having another airbag in an uninflated position.
Figure 8:
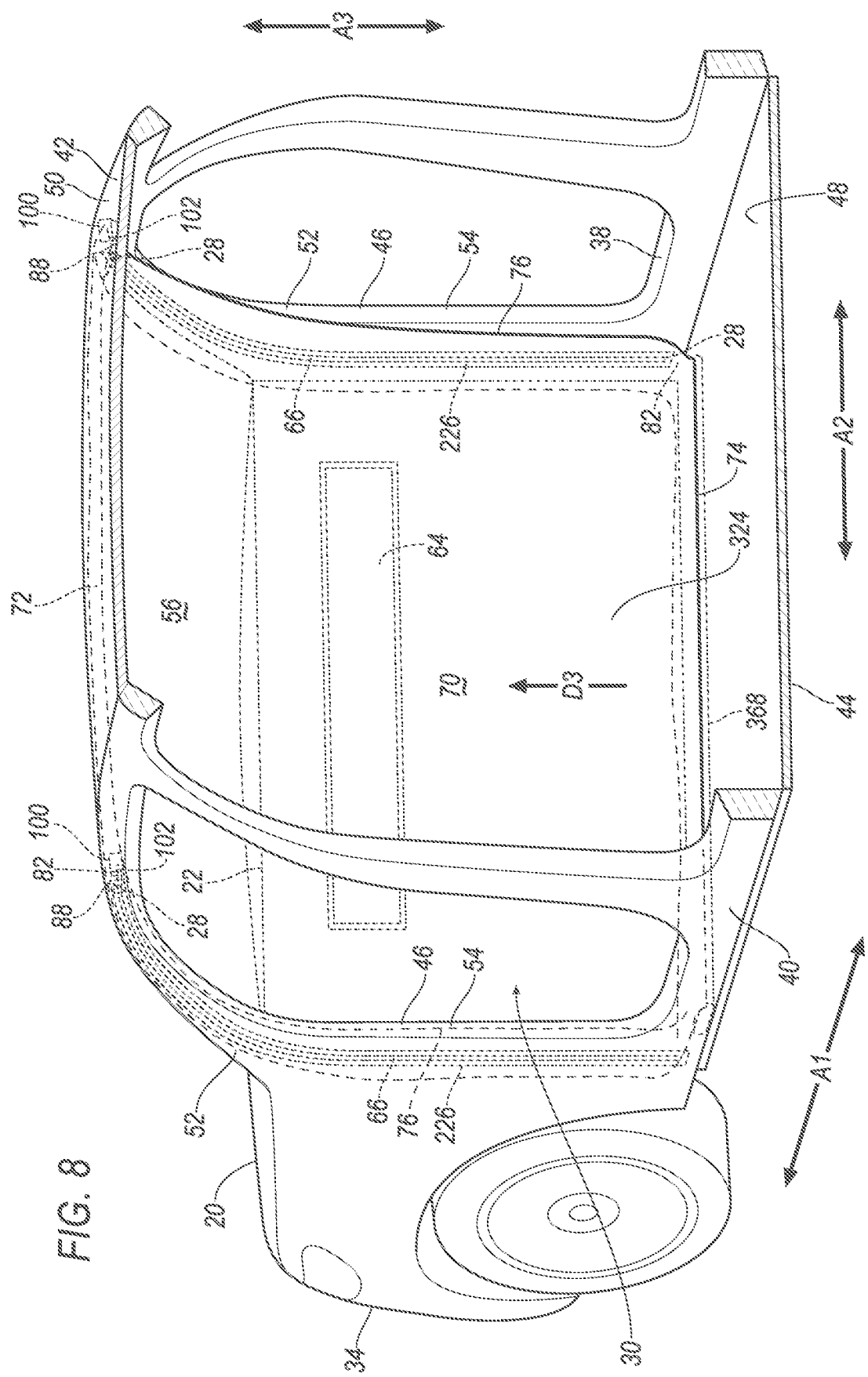
FIG. 8 is a perspective view of the vehicle having the airbag of FIG. 7 in an inflated position.

The airbag 124, 224, 324 in the uninflated position may by elongated and support relative to the front bulkhead 22, e.g., by the housing 168, 268, 368. For example, and with reference to FIGS. 5 and 7, the airbag 224, 324 in the uninflated position and the housing 168, 268, 368 may elongated along the cross-vehicle axis A2. As shown in FIG. 7, the airbag 324 in the uninflated position and the housing 368 may be beneath the instrument panel 64, e.g., relative to the vertical axis A3. In other words, the instrument panel 64 may be between the airbag 324 in the uninflated position and the roof 50 relative to the vertical axis A3. As shown in FIG. 5, the airbag 224 in the uninflated position and the housing 268 may be above the instrument panel 64. As another example, and with reference to FIGS. 1 and 3, the airbag 124 in the uninflated position and the housing 168 may elongated along the vertical axis A3.

The airbag 124, 224, 324 defines an inflation direction D1, D2, D3 as the airbag 124, 224, 324 unfolds and/or unrolls to the inflated position. The inflation direction D1, D2, D3 is be a direction from a location the airbag 124, 224, 324 in the uninflated position to the airbag 124, 224, 324 in the inflated position. For example, and with refence to FIG. 4, the airbag 124 may define an inflation direction D1 that is inboard along the cross-vehicle axis A2, i.e., from the right side 38 or the left side 40 of the vehicle 20 toward a center of the vehicle 20 along the cross-vehicle axis A2. In other words, the airbags 124 supported by the pillars 46 at the right side 38 and the left side 40 of the vehicle 20 may inflate toward each other. As another example, and with refence to FIG. 6, the airbag 224 may define an inflation direction D2 that is downward along the vertical axis A3, i.e., from the housing 268 at the roof 50 and toward the floor 48 the of the vehicle 20 along the vertical axis A3. As yet example, and with refence to FIG. 8, the airbag 324 may define an inflation direction D3 that is upward along the vertical axis A3, i.e., from the housing 368 at the floor 48 and toward the roof 50 the of the vehicle 20 along the vertical axis A3.

The airbag 124, 224, 324 is inflatable to the inflated position, illustrated in FIGS. 2, 4, 6, and 8. The airbag 124, 224, 324 in the inflated position is adjacent the bulkhead 22, i.e., next to the bulkhead 22 without additional structures there between. The airbag 124, 224, 324 in the inflated position may abut the front bulkhead 22. For example, the airbag 124, 224, 324 in the inflated position may abut the instrument panel 64.

The airbag 124, 224, 324 in the inflated position includes an impact panel 70 that extends between a top edge 72 and an opposite bottom edge 74, and between opposing side edges 76. The impact panel 70 faces the seat 32. During an impact to the vehicle 20 an occupant of the seat 32 may contact the impact panel 70.

The airbag 124, 224, 324 in the inflated position may be located relative to the seat 32 to control movement of knees 78 of a test dummy 80 in the seat 32 during a vehicle front impact. For example, the bottom edge 74 of the impact panel 70 may be lower than the seating surface 62 and the top edge 72 of the impact panel 70 may be higher than the seating surface 62 relative to the vertical axis A3. As another example, the airbag 124, 224, 324 in inflated position may be directly forward of an anticipated location of the knees 78 of the test dummy 80, i.e., such that the knees 78 impact the impact panel 70 when the dummy 80 moves forward during a front impact to the vehicle 20.

The sliders 28 control kinematics of the airbag 124, 224, 324 relative to the tracks 126, 226, 326. The slider 28 may include a base 84 and an extension 86 that extends from the base 84, as illustrated in FIG. 9. The extension 86 may extend perpendicularly from the base 84. For example, the slider 28 may be generally T-shaped or I-shaped in cross second. Each slider 28 is slidable along the respective track 126, 226, 326. For example, a first slider 28 may be slidable along the first track 126, 226, 326 and a second slider 28 may be slidable along the second track 126, 226, 326. As further example, the base 84 may be on one and side of the track 26, 226, 326 and the extension 68 may extend through the passage 66 to an opposite side of the track 126, 226, 326.

Each slider 28 is fixed to one of the airbags 124, 224, 324. For example, a tether 82 may be fixed to the airbag 124, 224, 324, e.g., via stitching, friction weld, etc., and may be fixed to the slider 28, e.g., via fastener, loop, etc. Force and motion may be transferred from the slider 28 to the airbag 124, 224, 324, or vice versa, via the tether 82.

Each slider 28 is slidable between a first position and a second position. The slider 28 is in the first position when the airbag 124, 224, 324 is in the uninflated position. The slider 28 is in the second when the airbag 124, 224, 324 is in the inflated position. The first position is closer to the housing 168, 268, 368 supporting the respective airbag 124, 224, 324 in the first position than in the second position. In other words, the slider 28 may move away from the respective housing 168, 268, 368 when moving from the first position the second position.

A stop 88 may be fixed relative to each of the tracks 126, 226, 326 at the second position. The stop 88 is a structure that restricts movement of the slider 28 along the respective track 126, 226, 326. For example, the stop 88 may be fixed within the passage 66 of the track 126, 226, 326 at the second position, i.e., such that the slider 28 in the second position abuts the stop 88.

A retainer 90 may be supported relative to each of the tracks 126, 226, 326. The retainer 90 is configured to maintain the respective slider 28 in the second position. The retainer 90 may permit the slider 28 to slide along the track 126, 226, 326 from the first position to the second position and restrict the slider 28 from sliding from the second position to the first position. The retainer 90 may be supported by the track 126, 226, 326, e.g., in the passage 66. For example, the retainer 90 may be a wedge fixed in the passage 66 and having a first surface 92 and a second surface 94. The first surface 92 may be closer to the housing 168, 268, 368 than the second surface 94, and the second surface 94 may be closer to the stop 88 than the first surface 92. In other words, the first surface 92 may between the housing 168, 268, 368 and the second surface 94 along the track 126, 226, 326, and the second surface 94 may be between the first surface 92 and the stop 88 along the track 126, 226, 326. The first surface 92 may extend at a shallower angle relative to the track 126, 226, 326 than the second surface 94. For example, the first surface 92 may extend at a less than 45-degree angle relative to elongation of the track 126, 226, 326, and the second surface 94 may extend at a generally 90 degree relative to elongation the track 126, 226, 326. Normal forces between the first surface 92 and the slider 28 as the slider 28 moves to the second position may flex the retainer 90, e.g., out of a path of the slider 28, and/or generally provide insufficient force to restrict moment of the slider 28. Normal forces between the second surface 94 and the slider 28 as the slider 28 is urged away from the second position may maintain the slider 28 in the second position. In other words, the first surface 92 and the second surface 94 of the retainer 90 may function as a ratchet tooth. The retainer 90 may include other suitable structure to permit the slider 28 to slide to the second position and to maintain the slider 28 in the second position.

An inflator 96 may be connected to the airbag 124, 224, 324. Upon receiving a signal from, e.g., a vehicle controller 98 (illustrated in FIG. 12), the inflator 96 may inflate the airbag 124, 224, 324 with an inflatable medium, such as a gas. The inflator 96 may be, for example, a pyrotechnic inflator that uses a chemical reaction to drive inflation medium to the airbag 124, 224, 324. The inflator 96 may be of any suitable type, for example, a cold-gas inflator. The inflator 96 may be in the housing 168, 268, 368.

A retractor 100 may be fixed relative to the bulkhead 22. For example, the retractor 100 may be fixed to the bulkhead 22, the floor 48, one of the pillars 46, etc., e.g., proximate the stop 88. The retractor 100 may be operatively coupled to the slider 28 such that actuation of the retractor 100, e.g., by the controller 98, urges the slider 28 toward the second position. The retractor 100 may by operatively coupled to the slider 28 with a cable 102. For example, the retractor 100 may include a pyrotechnic rotary actuator, e.g., having a spool and pyrotechnic material that ignites, combusts, detonates, and/or explodes upon actuation and rotates the spool. The cable 102 may be connected to the spool, i.e., such that rotation of the spool retracts the cable 102 via winding the cable 102 around the spool. The cable 102 may be fixed to the slider 28. Actuation of the pyrotechnic material may rotate the spool and retract the cable 102, urging the slider 28 along the track 126, 226, 326 toward the second position. The retractor 100 may include other suitable structure to urge the slider 28 along the track 126, 226, 326 toward the second position.

Figure 12:
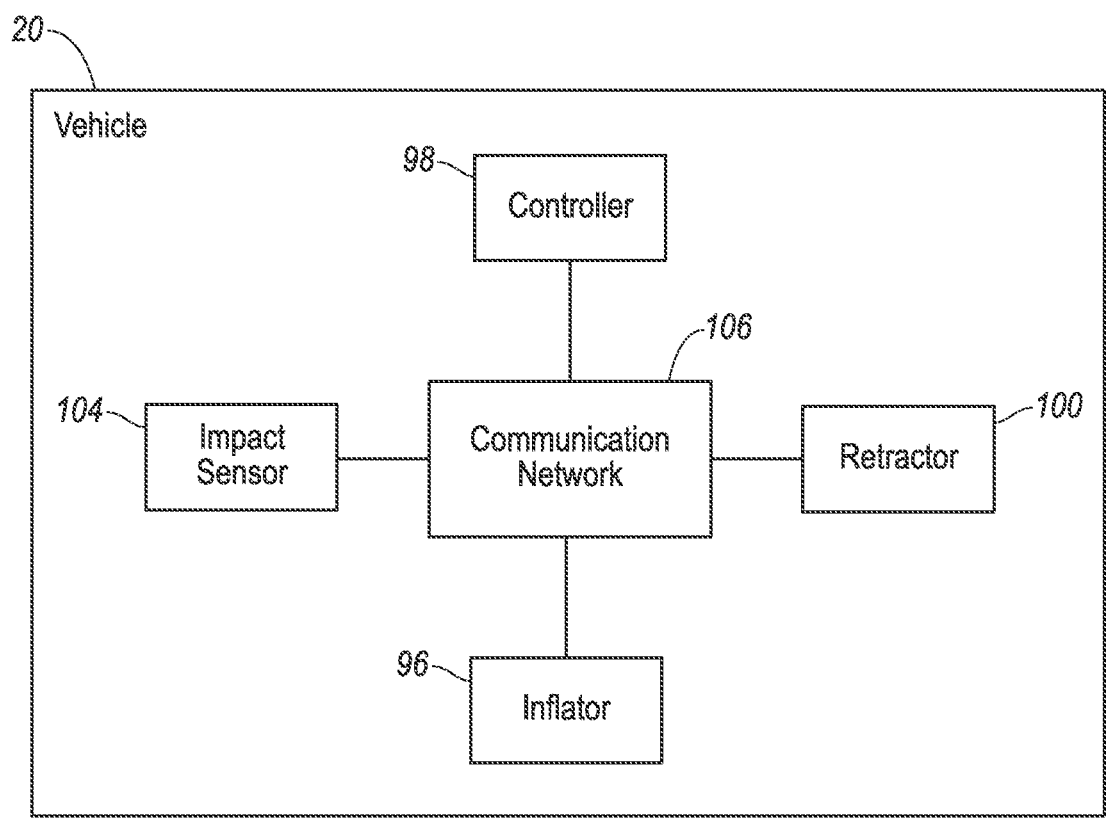
FIG. 12 is a block diagram of components of the vehicle.

With reference to FIG. 12, an impact sensor 104 may programmed to detect an impact to the vehicle 20. The impact sensor 104 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 104 may be located at numerous points in or on the vehicle 20. The impact sensor 104 may be in communication with the controller 98.

The vehicle controller 98, implemented via circuits, chips, or other electronic components, is included in the vehicle 20 control system for carrying out various operations, including as described herein. The vehicle controller 98 is a computing device that generally includes a processor and a memory, the memory including one or more forms of computer-readable media and storing instructions executable by the processor for performing various operations, including as disclosed herein. The memory of the vehicle controller 98 further generally stores remote data received via various communications mechanisms; e.g., the vehicle controller 98 is generally configured for communications on a controller area network (CAN) bus or the like, and/or for using other wired or wireless protocols, e.g., Bluetooth, etc. The vehicle controller 98 may also have a connection to an onboard diagnostics connector (OBD-II). Via a communication network 106, using Ethernet, WiFi, the CAN bus, Local Interconnect Network (LIN), and/or other wired or wireless mechanisms, the vehicle controller 98 may transmit messages to various devices in the vehicle 20 and/or receive messages from the various devices, e.g., inflators 96, retractors 100, impact sensors 104, etc. Although one vehicle controller 98 is shown in FIG. 12 for ease of illustration, it is to be understood that the vehicle controller 98 could include, and various operations described herein could be carried out by, one or more computing devices.

The communication network 106 includes hardware, such as a communication bus, for facilitating communication among vehicle components. The communication network 106 may facilitate wired or wireless communication among the components in accordance with a number of communication protocols such as controller area network (CAN), Ethernet, WiFi, Local Interconnect Network (LIN), and/or other wired or wireless mechanisms.

In the event of an impact, the impact sensor 104 may detect the impact and transmit a signal through the communications network to the vehicle controller 98. The vehicle controller 98 may transmit a signal through the communications network to the inflator 96 and the retractor 100. The inflator 96 may discharge and inflate the airbag 124, 224, 324, and the retractor 100 may actuate and urge the slider 28 toward the second position. The slider 28 may travel along the track 126, 226, 326 to the second position abutting the stop 88, and the retainer 90 may maintain the slider 28 in the second position. The airbag 124, 224, 324 in the inflated position may control kinematics of an object, such as the crash test dummy 80, in the passenger cabin 30, and the slider 28 may control kinematics of the airbag 124, 224, 324 in the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
a front bulkhead;
a seat having a seating surface;
an airbag inflatable from an uninflated position to an inflated position adjacent the bulkhead, the airbag in the inflated position includes a bottom edge that is lower than the seating surface;
a track fixed relative to the bulkhead; and
a slider fixed to the airbag and slidable along the track between a first position when the airbag is in the uninflated position and a second position when the airbag is in the inflated position.

2. The vehicle of claim 1, further comprising a retractor fixed relative to the bulkhead and operatively coupled to the slider.

3. The vehicle of claim 2, wherein the retractor includes a pyrotechnic rotary actuator operatively coupled to the slider with a cable.

4. The vehicle of claim 1, wherein the airbag in the inflated position is located relative to the seat to control movement of knees of a test dummy in the seat during a vehicle front impact.

5. The vehicle of claim 1, further comprising a retainer supported relative to the track and configured to maintain the slider in the second position.

6. The vehicle of claim 1, further comprising a stop fixed relative to the track at the second position.

7. The vehicle of claim 1, further comprising a second track fixed relative to the bulkhead and a second slider fixed to the airbag and slidable along the second track.

8. The vehicle of claim 7, wherein the track is spaced from the second track along a vertical axis.

9. The vehicle of claim 7, wherein the track is spaced from the second track along a cross-vehicle axis.

10. The vehicle of claim 1, wherein the track is elongated along a vertical axis.

11. The vehicle of claim 1, further comprising a pillar, the track fixed to the pillar.

12. The vehicle of claim 1, wherein the front bulkhead includes an instrument panel.

13. The vehicle of claim 12, wherein the track is beneath the instrument panel.

14. The vehicle of claim 12, wherein the airbag in the uninflated position is elongated along a cross-vehicle axis and is beneath the instrument panel.

15. The vehicle of claim 1, wherein the airbag defines an inflation direction that is inboard along a cross-vehicle axis.

16. The vehicle of claim 1, wherein the airbag defines an inflation direction that is upward along a vertical axis.

17. The vehicle of claim 1, wherein the airbag defines an inflation direction that is downward along a vertical axis.

18. The vehicle of claim 1, further comprising a second airbag inflatable from an uninflated position to an inflated position adjacent bulkhead, the airbag and the second airbag inflating toward each other.

19. A vehicle, comprising:
a front bulkhead;
an airbag inflatable from an uninflated position to an inflated position adjacent the bulkhead;
a track fixed relative to the bulkhead, the track elongated along a cross-vehicle axis; and
a slider fixed to the airbag and slidable along the track between a first position when the airbag is in the uninflated position and a second position when the airbag is in the inflated position.

20. The vehicle of claim 19, wherein the track is beneath the instrument panel.

* * * * *